(12) United States Patent
Salameh et al.

(10) Patent No.: US 11,914,672 B2
(45) Date of Patent: Feb. 27, 2024

(54) METHOD OF NEURAL ARCHITECTURE SEARCH USING CONTINUOUS ACTION REINFORCEMENT LEARNING

(71) Applicants: Mohammad Salameh, Edmonton (CA); Keith George Mills, Leduc (CA); Di Niu, Edmonton (CA)

(72) Inventors: Mohammad Salameh, Edmonton (CA); Keith George Mills, Leduc (CA); Di Niu, Edmonton (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 17/488,796

(22) Filed: Sep. 29, 2021

(65) Prior Publication Data
US 2023/0096654 A1    Mar. 30, 2023

(51) Int. Cl.
*G06F 18/214* (2023.01)
*G06N 3/04* (2023.01)
*G06F 18/21* (2023.01)

(52) U.S. Cl.
CPC .......... *G06F 18/214* (2023.01); *G06F 18/217* (2023.01); *G06N 3/04* (2013.01)

(58) Field of Classification Search
CPC .................................................... G06F 18/214
See application file for complete search history.

(56) References Cited

U.S. PATENT DOCUMENTS

| | | | |
|---|---|---|---|
| 2020/0082275 A1 | 3/2020 | Sun et al. | |
| 2020/0293883 A1 | 9/2020 | Budden et al. | |
| 2021/0357744 A1* | 11/2021 | Mittal | G06F 18/22 |
| 2022/0237788 A1* | 7/2022 | Shaul | G06V 20/698 |
| 2022/0413943 A1* | 12/2022 | Poornachandran | G06F 9/5027 |

FOREIGN PATENT DOCUMENTS

| | | |
|---|---|---|
| CN | 110651279 | 1/2020 |
| WO | 20190007388 | 1/2019 |
| WO | 2020160252 | 8/2020 |

OTHER PUBLICATIONS

Elsken, Thomas, Jan Hendrik Metzen, and Frank Hutter. "Neural architecture search: A survey." arXiv preprint arXiv:1808.05377 2018.

(Continued)

*Primary Examiner* — Oneal R Mistry

(57) ABSTRACT

A method and system for generating neural architectures to perform a particular task. An actor neural network, as part of a continuous action reinforcement learning (RL) agent, generates a randomized continuous actions parameters to encourage exploration of a search space to generate candidate architectures without bias. The continuous action parameters are discretized and applied to a search space to generate candidate architectures, the performance of which for performing the particular task is evaluated. Corresponding reward and state are determined based on the performance. A critic neural network, as part of the continuous action RL agent, learns a mapping of the continuous action to a reward using modified Deep Deterministic Policy Gradient (DDPG) with quantile loss function by sampling a list of top performing architectures. The actor neural network is updated with the learned mapping.

20 Claims, 13 Drawing Sheets

(56) References Cited

OTHER PUBLICATIONS

Liu, Hanxiao, Karen Simonyan, and Yiming Yang. "Darts: Differentiable architecture search." arXiv preprint arXiv:1806.09055 2018.
Shu, Yao, Wei Wang, and Shaofeng Cai. "Understanding Architectures Learnt by Cell-based Neural Architecture Search." International Conference on Learning Representations 2019.
Zela, Arber, et al. "Understanding and robustifying differentiable architecture search." arXiv preprint arXiv:1909.09656 2019.
Chen, Xiangning, and Cho-Jui Hsieh. "Stabilizing Differentiable Architecture Search via Perturbation-based Regularization." arXiv preprint arXiv:2002.05283 2020.
Xu, Yuhui, et al. "Pc-darts: Partial channel connections for memory-efficient differentiable architecture search." arXiv preprint arXiv:1907.05737 2019.
Xie, Sirui, et al. "SNAS: stochastic neural architecture search." arXiv preprint arXiv:1812.09926 2018.
Dong, Xuanyi, and Yi Yang. "Searching for a robust neural architecture in four gpu hours." Proceedings of the IEEE Conference on computer vision and pattern recognition 2019.
Williams, Ronald J. "Simple statistical gradient-following algorithms for connectionist reinforcement learning." Machine learning 8.3-4 1992.
Schulman, John, et al. "Proximal policy optimization algorithms." arXiv preprint arXiv:1707.06347 2017.
Timothy P. Lillicrap, Jonathan J. Hunt, Alexander Pritzel, Nicolas Heess, Tom Erez, Yuval Tassa, David Silver and Daan Wierstra, Continuous control with deep reinforcement learning, arXiv:1509.02971 2015.
Zoph, Barret, and Quoc V. Le. "Neural architecture search with reinforcement learning." arXiv preprint arXiv:1611.01578 2016.
Pham, Hieu, et al. "Efficient neural architecture search via parameter sharing." arXiv preprint arXiv:1802.03268 2018.
Koenker, Roger, Chapter 1: Introduction, Quantile Regression, Cambridge University Press, 25 pages 2005.
Dong, Xuanyi, and Yi Yang. "Nas-bench-201: Extending the scope of reproducible neural architecture search." arXiv preprint arXiv:2001.00326 2020.
Li, Liam, et al. "Geometry-Aware Gradient Algorithms for Neural Architecture Search." arXiv preprint arXiv:2004.07802 2020.
Chen, Xin, et al. "Progressive darts: Bridging the optimization gap for nas in the wild." arXiv preprint arXiv:1912.10952 2019.
Alex Krizhevsky, Learning Multiple Layers of Features from Tiny Images 2009.
Fujimoto, Scott, Herke Van Hoof, and David Meger. "Addressing function approximation error in actor-critic methods." arXiv preprint arXiv:1802.09477 2018.
Tong Mo, Yakun Yu, Mohammad Salameh, Di Niu, Shangling Jui, Neural Architecture Search for Keyword Spotting, to appear at InterSpeech 2020, Shanghai, China 2020.
Kaicheng Yu, Christian Sciuto, Martin Jaggi, Claudiu Musat, and Mathieu Salzmann, Evaluating The Search Phase of Neural Architecture Search, arXiv preprint arXiv:1902.08142 2019.
James A. Preiss, Eugen Hotaj and Hanna Mazzawj, A Closer Look At Reinforcement Learning for Neural Architecture Search, 1st Workshop in Neural Architecture Search, ICLR 2020.
Gabriel Bender, Hanxiao Liu, Bo Chen, Grace Chu, Shuyang Cheng, Pieter-Jan Kindermans and Quoc Le, Can weight sharing outperform random architecture search? An investigation with TuNAS 2020.

* cited by examiner

Algorithm 1 Discrete Architecture Mapping

Input: $\alpha \in \mathbb{R}^{|E| \times |O|}$
Output: $\alpha^d \in \{0, 1\}^{|E| \times |O|}$
Start $= 0$, $n = 1$
$\alpha^d = 0$
for $k = 0, 1, ..., |N| - 1$ do
    End $=$ Start $+ n$
    $A = \alpha[\text{Start} : \text{End}, :]$
    $(i_1, j_1) = \arg\max_{(i,j)} A_{ij}$
    $(i_2, j_2) = \arg\max_{(i,j), i \neq i_1} A_{ij}$
    $\alpha^d[\text{Start} + i_1, j_1] = 1$
    $\alpha^d[\text{Start} + i_2, j_2] = 1$
    Start $=$ End $+ 1$
    $n = n + 1$
end for
Return $\alpha^d$

FIG. 6

| Method | CIFAR-10 | CIFAR-100 | ImageNet |
|---|---|---|---|
| DARTS | 54.30 ± 0.00 | 15.61 ± 0.00 | 16.32 ± 0.00 |
| ENAS | 53.89 ± 0.58 | 13.96 ± 2.33 | 14.84 ± 2.10 |
| GDAS | 93.52 ± 0.15 | 67.52 ± 0.15 | 40.91 ± 0.12 |
| GAEA | 94.10 ± 0.29 | 73.43 ± 0.13 | 46.36 ± 0.00 |
| RS | 93.70 ± 0.36 | 71.04 ± 1.07 | 44.57 ± 1.25 |
| REA | 93.92 ± 0.30 | 71.84 ± 0.99 | 45.54 ± 1.03 |
| REINFORCE | 93.85 ± 0.37 | 71.71 ± 1.00 | 45.24 ± 1.18 |
| BOHB | 93.61 ± 0.52 | 70.85 ± 1.28 | 44.42 ± 1.49 |
| CADAM-500 | 94.11 ± 0.16 | 72.69 ± 0.58 | 46.74 ± 0.39 |
| CADAM-1k | 94.28 ± 0.08 | 73.09 ± 0.35 | 47.03 ± 0.27 |
| *Optimal* | *94.37* | *73.51* | *47.31* |

FIG. 10

| Architecture | Test Acc. [%] | Params |
|---|---|---|
| ENAS | 97.11 | 4.6M |
| GDAS | 97.18 | 2.5M |
| AlphaX | 97.46 ± 0.06 | 2.8M |
| ProxylessNAS | 97.92 | 5.7M |
| DARTS 1st | 97.00 ± 0.14 | 3.3M |
| DARTS 2nd | 97.24 ± 0.09 | 3.3M |
| SNAS | 97.15 ± 0.02 | .8M |
| P-DARTS | 97.50 | 3.4M |
| PC-DARTS | 97.43 ± 0.07 | 3.6M |
| PC-SDARTS | 97.51 ± 0.04 | 3.5M |
| P-DARTS | 97.52 ± 0.02 | 3.4M |
| PC-GAEA | 97.50 ± 0.06 | 3.7M |
| CADAM | 97.46 ± 0.06 | 2.8M |
| PC-CADAM | 97.43 ± 0.09 | 5.8M |

FIG. 12

| Architecture | TOP-1 Acc. [%] | TOP-5 Acc. [%] | Params |
|---|---|---|---|
| DARTS-C10 | 73.3 | 91.3 | 4.7M |
| SNAS-C10 | 72.7 | 90.8 | 4.3M |
| PDARTSS-C10 | 75.6 | 92.6 | 4.9M |
| P-DARTS-C100 | 75.3 | 92.5 | 5.1M |
| PC-DARTS-C10 | 74.9 | 92.2 | 5.3M |
| PC-DARTS-IN | 75.8 | 92.7 | 5.3M |
| PC-SDARTS-C10 | 75.7 | 92.6 | - |
| P-SDARTS-C10 | 75.8 | 92.8 | - |
| PC-GAEA-C10 | 75.7 | 92.7 | 5.3M |
| PC-GAEA-IN | 76.0 | 92.7 | 5.6M |
| CADAM-C10 | 75.0 | 92.3 | 5.3M |
| PC-CADAM-C10 | 75.5 | 92.5 | 5.4M |
| PC-CADAM-IN | 75.1 | 92.3 | 5.0M |

FIG. 13

METHOD OF NEURAL ARCHITECTURE SEARCH USING CONTINUOUS ACTION REINFORCEMENT LEARNING

RELATED APPLICATION DATA

The present application claims priority to, and the benefit of, provisional U.S. patent application No. 63/085,713 filed Sep. 30, 2020, the content of which is incorporated herein by reference.

TECHNICAL FIELD

Embodiments of the present invention relate to the neural network architecture, and in particular, to a method and system for automatically determining architectures for neural networks.

BACKGROUND

Automated Machine Learning (AutoML) is a broad field of research associated with automating the process of applying machine learning to real-world problems with little to no human intervention. That is to say, for a given task, such as object detection, image classification, image segmentation or speech recognition, the goal of an AutoML algorithm is to automatically produce a neural network model that performs well on said task. Neural Architecture Search (NAS) is a subset of AutoML methods concerned with automating the design of neural network architectures.

NAS algorithms are primarily comprised of three core components: (1) a search space—the set of all possible candidate architectures; (2) a search algorithm—the method by which the search space is traversed; and (3) an evaluation strategy—how the search algorithm gauges the performance of architectures in the search space.

One common approach to speed up the evaluation strategy component of NAS is by condensing all possible candidate architectures in the search space into one neural network, called a "supernet". The advent of a weight-sharing supernet has further improved the performance of supernet-based algorithms. Differentiable Architecture Search (DARTS) as described in "*Darts: Differentiable architecture search*" by Liu, Hanxiao, Karen Simonyan, and Yiming Yang (2018), the disclosure of which is incorporated herein in its entirety, is a well known NAS algorithm that utilizes a weight-sharing supernet and can also be characterized as a differential architecture search algorithm. The search space is defined in a continuous domain, which allows DARTS to use calculus-based methods, e.g. differential approaches like gradient descent as its search algorithm. For example, a model search is first performed on a supernet by a search algorithm for a set number of times. Upon completion of the model search, one of the candidate architectures located by the search algorithm in the supernet is considered as the best architecture. This located architecture is then expanded and retrained from scratch in order to perform a formal evaluation.

However, research literature has shown that differentiable NAS algorithms like DARTS may suffer from an inherent lack of search space exploration. Specifically, in "*Understanding Architectures Learnt by Cell-based Neural Architecture Search*", Shu, Yao, Wei Wang, and Shaofeng Cai, International Conference on Learning Representations (2019), the disclosure of which is incorporated herein in its entirety, that DARTS may be biased towards selecting architectures that are wide and shallow over architectures that are deep and narrow. In more general terms, this means that the search algorithm of DARTS may only visit specific regions of the search space. The bias of the DARTS algorithm stems, at least in part, from its gradient-based search algorithm such as gradient descent, which, by design, seeks and converges towards the nearest local loss minima as quickly as possible. Consequently, gradient-based NAS algorithms may gravitate towards regions of the search space where the supernet can train rapidly. The lack of exploration may in some cases mean that the best architecture was never explored or attempted by the NAS algorithm. Moreover, due to the nature of optimization in DARTS, minor changes to the currently selected architecture can result in significant drops in performance. Thus in practice, the portions of the search space visited by the search algorithm of DARTS is very narrow. Attempts have been made to address the issues with the DARTS search algorithm. In "*Stabilizing Differentiable Architecture Search via Perturbation-based Regularization*", Chen, Xiangning, and Cho-Jui Hsieh (2020), the disclosure of which is incorporated herein in its entirety, it was proposed that the search algorithm may be modified such that the performance penalty imposed when changing the supernet architecture is dramatically reduced. Although such modifications may permit increased exploration within the supernet, it lacks a mechanism that actively encourage supernet exploration.

Additionally, by monitoring the states of the search algorithm during execution, it has also been shown in "*Understanding and robustifying differentiable architecture search*", Zela, Arber, et al. (2019), the disclosure of which is incorporated herein in its entirety, that DARTS may be unstable and unable to generalize to different search spaces. Proposals have been made to address such instability by implementing an early stopping routine. While this technique may improve performance, in practice, an early stopping routine may limit the exploration potential as the search algorithm is allotted far less time to navigate the search space.

Furthermore, supernets are trained to minimize the loss as a whole instead of maximizing the performance of individual architectures. As the final evaluation of an architecture is performed on discrete architectures derived from the supernet, a discretization error, or optimization gap, exists between the performance of an architecture acting as part of a larger supernet and its true performance when evaluated individually.

Various approaches to improve the DARTS algorithm have been made in the research literature. In "PC-darts: Partial channel connections for memory-efficient differentiable architecture search", Xu, Yuhui, et al. (2019), the disclosure of which is incorporated herein in its entirety, the authors propose a Partially Connected DARTS (PC-DARTS) to modify the search space of DARTS to speed up the execution of experiments. While the number of architectures provided by both approaches is identical, PC-DARTS uses partial channel connections to reduce the memory overhead needed during training. Using the same hardware, PC-DARTS is capable of performing experiments with a larger batch size as well as performing experiments on larger datasets.

Other approaches, including Stochastic NAS (SNAS) as described in "SNAS: stochastic neural architecture search", Xie, Sirui, et al (2018) and Gradient-based search using Differentiable Architecture Sampler (GDAS) as described in "Searching for a robust neural architecture in four GPU hours", Dong, Xuanyi, and Yi Yang, Proceedings of the IEEE Conference on computer vision and pattern recognition. (2019), the disclosures of which are incorporated herein in their entirety, are similar approaches to DARTS. Both SNAS and GDAS methods employ the use of Gumbel Softmax when operating on the search space. The search algorithm is more specific in describing the architectures it selects. The selection mechanism also employs further exploration compared to DARTS. However, the final results of the method are inferior to that of DARTS.

Accordingly, there exists a need for a neural architecture search method and system that overcomes one or more of the shortcomings of the existing approaches described above.

SUMMARY

This application provides a method and system of NAS that uses continuous reinforcement learning (RL) as a search algorithm, while promoting exploration as compared to gradient descent optimization. A NAS method is described herein, which may incorporate additional RL-based exploration strategies into the search algorithm. The described NAS method may remove bias of the search algorithm towards specific regions of the search space. The described NAS method may also allow a supernet to be trained once and re-used multiple times, which enables performing all operation weight updates in supernet training, allowing increased batch size during model search. Further, the described NAS method may force candidate neural network architectures in the search space to be more accurately representative of the architectures present during evaluation. Thus minimizing discretization error. Further still, the described NAS method may also provide statistical information regarding the search space during search for optimal architectures.

In accordance with an embodiment of the first aspect of the present disclosure, there is provided a method for neural architectural search (NAS) for performing a task. The method comprises: (i) generating, by an actor neural network having actor parameters in accordance with current values of the actor parameters, a set of continuous neural network architecture parameters comprising score distributions over possible values for configuring a plurality of architecture cells of a trained search space; (ii) discretizing the set of continuous architecture parameters into a set of discrete neural network architecture parameters; (iii) generating a candidate architecture by configuring the trained search space using the discrete neural network architecture parameters, which specify a subset of the plurality of architecture cells to be active; (iv) evaluating a performance of the candidate architecture at performing the task; (v) determining a reward and a state for the discrete neural network architecture parameters based on the performance; (vi) storing an experience tuple comprising the continuous neural network architecture parameters, the reward, and the state in a buffer storage; (vii) learning a mapping, by a critic neural network, between network architectures and performance; and (viii) updating the actor neural network with the learned mapping from the critic neural network.

In some or all examples, the method further comprises: providing the trained search space comprising the plurality of architecture cells.

In some or all examples, the generating comprises incorporating a randomized noise value into the set of continuous neural network architecture parameters.

In some or all examples, the search space is a weight-sharing supernet, and is trained by, in each training session in a plurality of training sessions: generating, from a set of training data, a batch of training data comprising a plurality of training data samples. The generating a batch of training data comprising a plurality of training data comprises, for each training data sample, performing the operations of: generating a set of continuous neural network architecture parameters comprising score distributions over possible values for configuring the plurality of architecture cells; discretizing the set of continuous architecture parameters into a set of discrete neural network architecture parameters; selecting a candidate architecture by assigning the discrete neural network architecture parameters to the supernet; evaluating a performance of the selected candidate architecture at performing the task with a performance metric; determining a loss value as a function of the difference between the performance metric and validation data; and updating a subset of the weight values of the supernet to minimize the loss value.

In some or all examples, the updating further comprises only updating the weight values of the supernet that are associated with the candidate architecture.

In some or all examples, the method further comprises: storing, based on the performance of the candidate architecture, a list of top performing candidate architectures into an architecture history storage.

In some or all examples, the storing comprises: comparing the performance of the candidate architecture with a performance of a worst stored architecture; if the performance of the candidate architecture is better than the performance of the worst stored architecture, replacing the worst stored architecture with the candidate architecture; and sorting the list of top performing architecture based on performance.

In some or all examples, the discretizing uses a many-to-one mapping algorithm.

In some or all examples, the learning comprises: sampling a batch from the buffer storage; and for each experience tuple in the batch, performing operations comprising: predicting a reward of the candidate architecture based on a current mapping; determining a check loss using quantile regression as a function of the predicted reward and the reward from each experience tuple; and updating the current mapping to minimize the check loss.

In some or all examples, the check loss is determined using the following equation:

$$\mathcal{L}_{critic} = \frac{1}{|B_R|} \sum_{i \in B_R} u_i(\tau - 1(u_i < 0)),$$

where $\mathcal{L}_{critic}$ is the check loss, $B_R$ is the batch of training data, $\tau$ is a decimal value $\tau \in [0,1]$ that corresponds to a desired quantile level of the reward from each experience tuple, and $u_i$ is a difference between the predicted reward and the reward from each experience tuple.

In some or all examples, the parameter $u_i$ is determined using the following equation:

$$u_i = r_i - Q(a_i),$$

where $r_i$ is a mapped reward for the $i^{th}$ action $a_i$, $Q(a_i)$ is the predicted reward value for $a_i$, and $u_i$ is the difference between the mapped reward for the $i^{th}$ action $a_i$ and the predicted reward value for $a_i$.

In some or all examples, the parameter T is used to cause the critic to learn a mapping from a desired performance quantile of candidate architectures.

In some or all examples, the task is image classification and reward value $r_t$ may be determined in accordance with the following equation:

$$r_t = 100^{Acc(\alpha_t^d)},$$

where $Acc(\alpha_t^d)$ is the accuracy value of the candidate architecture selected based on the discrete architecture parameters $\alpha_t^d$ in its decimal form.

In some or all examples, the updating comprises: determining a loss value using the following equation:

$$\mathcal{L}_{actor} = \frac{1}{|B_R|} \sum_{i \in B_R} Q(\mu(s_i)),$$

where $\mathcal{L}_{actor}$ is the loss value of the actor neural network, $B_R$ is the batch of training data, and $Q(\mu(s_i))$ is a predicted reward by critic neural network of each output $\mu(s_i)$ of the actor neural network for a state corresponding to one of the experience tuples of the batch training data $B_R$.

In some or all examples, the randomized noise value is incorporated into the set of continuous neural network architecture parameters in accordance with a probability value.

In some or all examples, the method further comprises: initializing the probability value indicative of high probability; and annealing the probability value to a minimum value over a plurality of cycles.

In some or all examples, the annealing further comprises applying a cosine annealing schedule.

In some or all examples, the operations (I) to (viii) are repeatedly performed.

In some or all examples, each experience tuple is comprised of the state, action, and reward $(s_t, a_t, r_t)$ for each step t, wherein the state $s_t$ defines a set of channel-wise average of discrete neural network architecture parameters, the action $a_t$ is a set of continuous neural architecture parameters, and the reward $r_t$ defines the reward.

In accordance with another aspect of the present disclosure, there is provided a computing device comprising a processor and a memory, the memory having tangibly stored thereon executable instructions for execution by the processor. The executable instructions, in response to execution by the processor, cause the computing device to perform the methods described above and herein.

In accordance with a further aspect of the present disclosure, there is provided a non-transitory machine-readable storage medium having tangibly stored thereon executable instructions for execution by a processor of a computing device. The executable instructions, in response to execution by the processor, cause the computing device to perform the methods described above and herein.

Other aspects and features of the present disclosure will become apparent to those of ordinary skill in the art upon review of the following description of specific implementations.

BRIEF DESCRIPTION OF THE DRAWINGS

Reference will now be made, by way of example, to the accompanying drawings which show example embodiments of the present application, and in which:

FIG. 6 illustrates an example pseudo-code representation of an discretization algorithm that can be implemented at step 504 of FIG. 5;

FIG. 10 illustrates a table of the accuracies between CADAM and several state of the art NAS algorithms on the NAS-Bench-201 Oracle performance benchmark set;

FIG. 12 illustrates a table of the accuracies between CADAM and several state of the art NAS algorithms on pre-trained DARTS and PC-DARTS supernets on the CIFAR-10 benchmark test; and FIG. 13 illustrates a table of the accuracies between CADAM (with DARTS supernet), PC-CADAM (with PC-DARTS supernet) and several state of the art NAS algorithms on the ImageNet dataset benchmark.

DETAILED DESCRIPTION OF EXAMPLE EMBODIMENTS

Figure 1D:
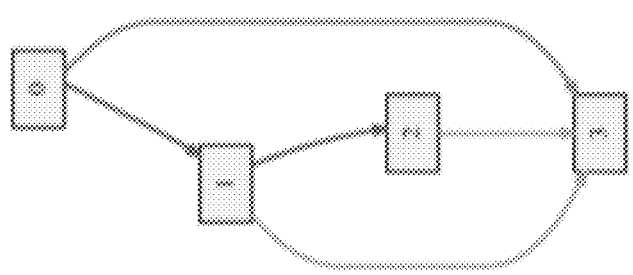
FIG. 1D illustrates a discretized version of the architecture cell in FIG. 1C.

The present disclosure is made with reference to the accompanying drawings, in which embodiments of technical solutions are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable storage medium. Lastly, elements referred to in the singular may be plural and vice versa, except where indicated otherwise either explicitly or inherently by context.

The present disclosure generally describes a Neural Architecture Search (NAS) system, also referred to as the Continuous Action Discrete Architecture Mapping (CADAM) system, that determines an architecture for a neural network that is configured to perform a particular neural network task, such as object detection, image classification, image segmentation or speech recognition.

In some embodiments, the present disclosure generally describes a NAS system that adopts a decoupled approach to supernet training to define a suitable search space representative of all possible candidate neural architectures, and the architecture search step to locate the top performing neural architectures. In example embodiments where a supernet is used as a search space, the supernet is trained by randomly and uniformly sampling individual candidate architectures and only updating the weights associated with each sampled candidate architecture, which may better reflect the conditions of the formal evaluation and thereby minimize discretization error. Once the supernet training is complete, all weight parameters of the supernet are maintained without further updates. Thus, the supernet is trained once and may be repeatedly used. Then the NAS system described herein, using a continuous action reinforcement learning (RL) agent based on modified Deep Deterministic Policy Gradient (DDPG) acting in a continuous action space, interacts with an environment comprising the trained supernet to find a number of high-performing architectures based on rewards received for performed actions.

In embodiments where oracle performance is available and no supernet is required, the RL agent in accordance with the present disclosure may function independently to locate high-performing architectures.

Generally, NAS algorithms aim to learn a set of architectural parameters that parameterize a candidate neural network. The architectural parameters are connected to different operations at different locations within the candidate neural network. Architecture cells form the building blocks of the supernet. Once trained, the architecture cells may be connected, as specified by architectural parameters, to form neural networks. FIGS. 1A-1D illustrate block diagrams of an architecture cell 100, which is in the form of a directed acyclic graph (DAG). As shown, architecture cell 100 includes of an ordered sequence of N nodes ($x^{(i)}$) 102, where each node 102 is a latent representation (e.g. a feature map in convolution networks) and each directed edge (i,j) 104 is associated with some operation $o^{(i,j)}$ that transforms 102. Each architecture cell 100 may receive outputs and/or states of previous cell as inputs. The output of architecture cell 100 may be obtained by applying a reduction operation, such as concatenation, to some or all of the intermediate nodes 102.

Figure 1C:
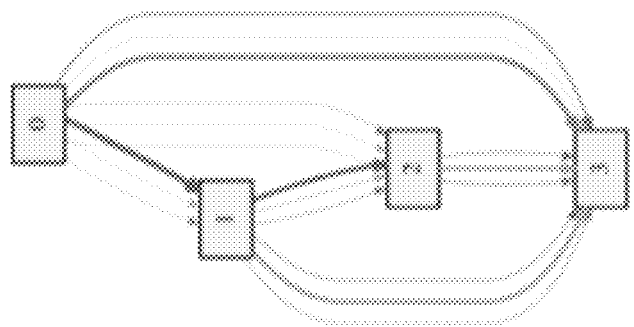
FIG. 1C illustrates an continuous representation of edges between each pair of adjacent nodes in the architecture cell of FIG. 1A.
Figure 1B:
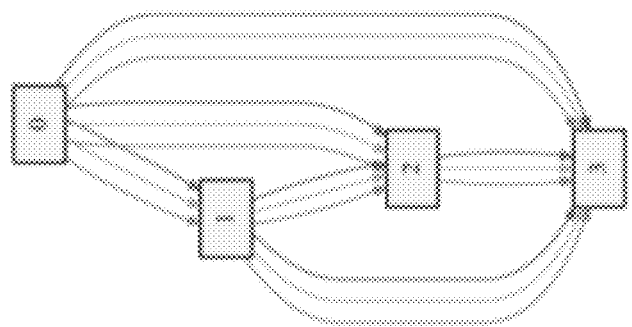
FIG. 1B illustrates all possible edges between adjacent nodes in the untrained architecture cell in FIG. 1A.
Figure 1A:
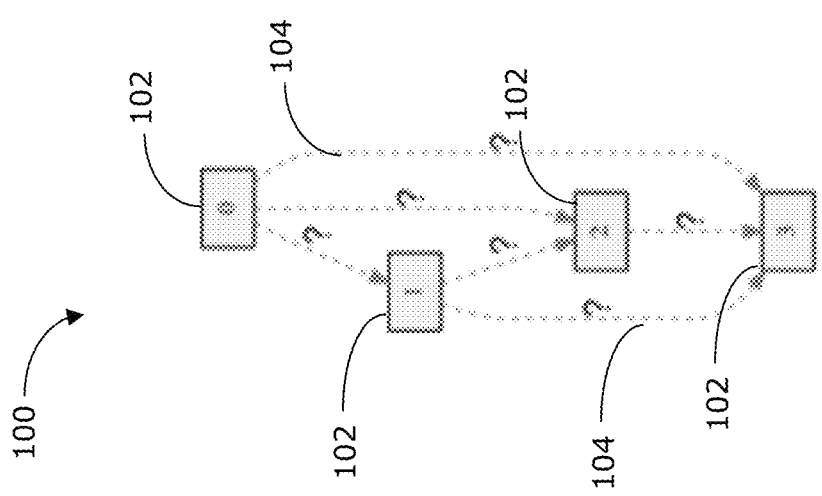
FIG. 1A illustrates an untrained architecture cell.

FIG. 1A illustrates an untrained architecture cell 100 where the edges 104 between nodes 102 have not been set. FIG. 1B illustrates all possible edges 104 between adjacent nodes 102. In some embodiments, the edges may be defined in a continuous manner where operations between nodes include a combination of some or all of the candidate operations. FIG. 1C illustrates a continuous representation of edges 104 between each pair of adjacent nodes 102 where darker lines denotes more weight and lighter lines denotes less weight. The continuous representation of each edge may be a distribution score over possible values for each of the edges 104. In some embodiments, multiple edges 104 between two adjacent nodes 102 may have the same weight. In some embodiments, some edges 104 may be excluded with a weight of 0. FIG. 1D illustrates a discretized cell where a definite edge 104 is chosen between adjacent cells 102. In some embodiments, the definite edge 104 may correspond with the edge 104 that was afforded the most weight.

Example Computing System

Figure 2:
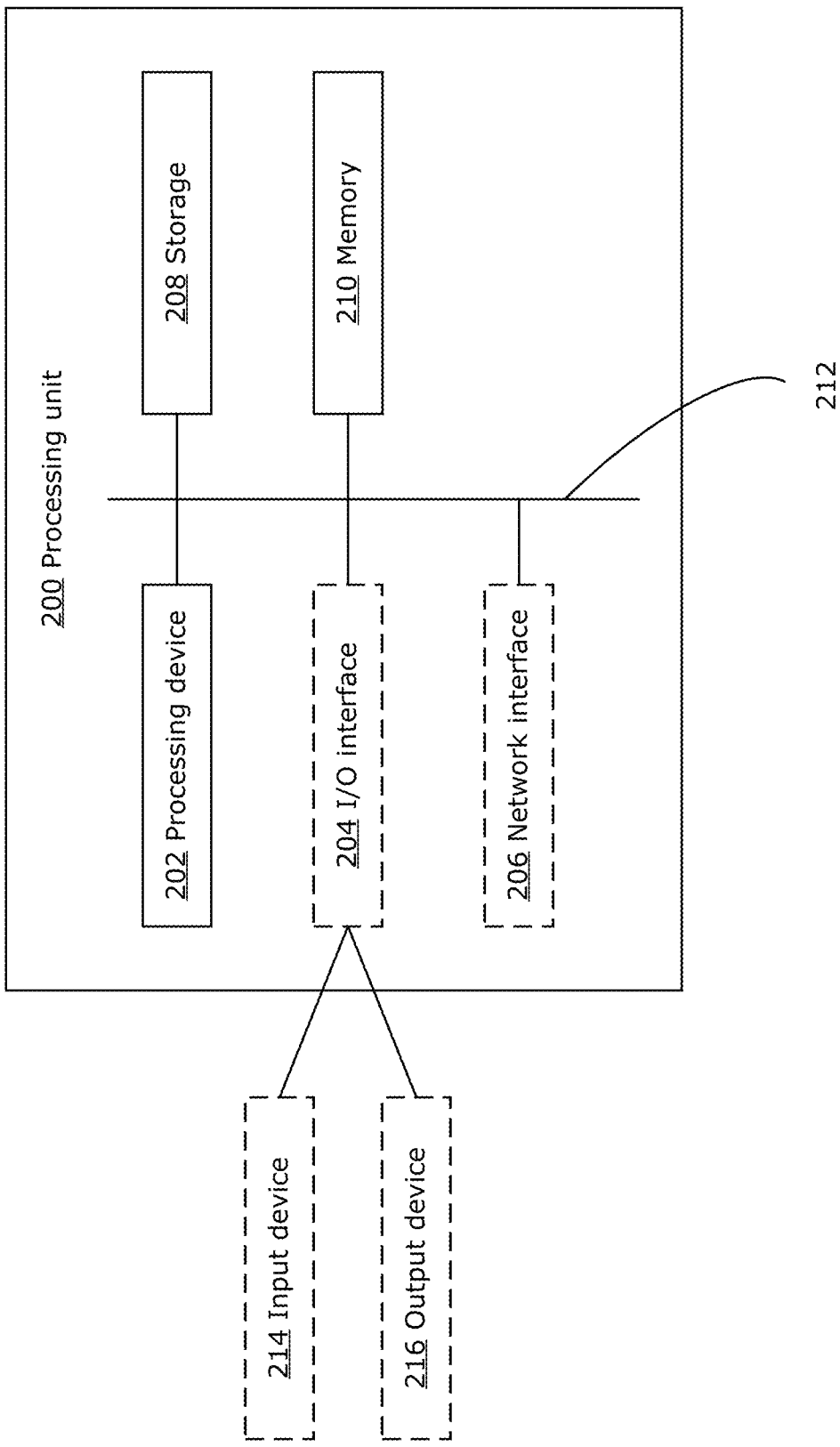
FIG. 2 illustrates a block diagram of an example simplified computing system that may be used to perform neural architecture search in accordance with example embodiments of the present disclosure.

FIG. 2 illustrates a block diagram of an example simplified computing system 200, which may be a device that is used to perform neural architecture search in accordance with examples disclosed herein or to execute the instructions of a candidate neural network with its architecture determined in accordance with the present disclosure to perform the specific task for which the candidate neural network has been trained (e.g. image classification, object recognition, etc.). Other computing system suitable for implementing embodiments described in the present disclosure may be used, which may include components different from those discussed below. In some examples, the computing system may be implemented across more than one physical hardware unit, such as in a parallel computing, distributed computing, virtual server, or cloud computing configuration. Although FIG. 2 shows a single instance of each component, there may be multiple instances of each component in the computing system 200.

The computing system 200 may include one or more processing device(s) 202, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 200 may also include one or more optional input/output (I/O) interfaces 204, which may enable interfacing with one or more optional input devices 214 and/or optional output devices 216. In the example shown, the input device(s) 214 (e.g., a keyboard, a mouse, a microphone, a touchscreen, and/or a keypad) and output device(s) 216 (e.g., a display, a speaker and/or a printer) are shown as optional and external to the computing system 200. In other examples, one or more of the input device(s) 214 and/or the output device(s) 216 may be included as a component of the computing system 200. In other examples, there may not be any input device(s) 214 and output device(s) 216, in which case the I/O interface(s) 204 may not be needed.

The computing system 200 may include one or more optional network interfaces 206 for wired or wireless communication with a network (e.g., an intranet, the Internet, a P2P network, a WAN and/or a LAN) or other node. The network interfaces 206 may include wired links (e.g., Ethernet cable) and/or wireless links (e.g., one or more antennas) for intra-network and/or inter-network communications.

The computing system 200 may also include one or more storage units 208, which may include a mass storage unit such as a solid state drive, a hard disk drive, a magnetic disk drive and/or an optical disk drive. The computing system 200 may include one or more memories 210, which may include a volatile or non-volatile memory (e.g., a flash memory, a random access memory (RAM), and/or a read-only memory (ROM)). The non-transitory memory(ies) 210 may store instructions for execution by the processing device(s) 202, such as to carry out examples described in the present disclosure. The memory(ies) 210 may include other software instructions, such as for implementing an operating system and other applications/functions. In some examples, memory 210 may include software instructions for execution by the processing device 202 to train a neural network and/or to implement a trained neural network, as disclosed herein.

In some other examples, one or more data sets and/or modules may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 212 providing communication among components of the computing system 200, including the processing device(s) 202, optional I/O interface(s) 204, optional network interface(s) 206, storage unit(s) 208 and/or memory(ies) 210. The bus 212 may be any suitable bus architecture including, for example, a memory bus, a peripheral bus or a video bus.

Supernet Training

Figure 3:
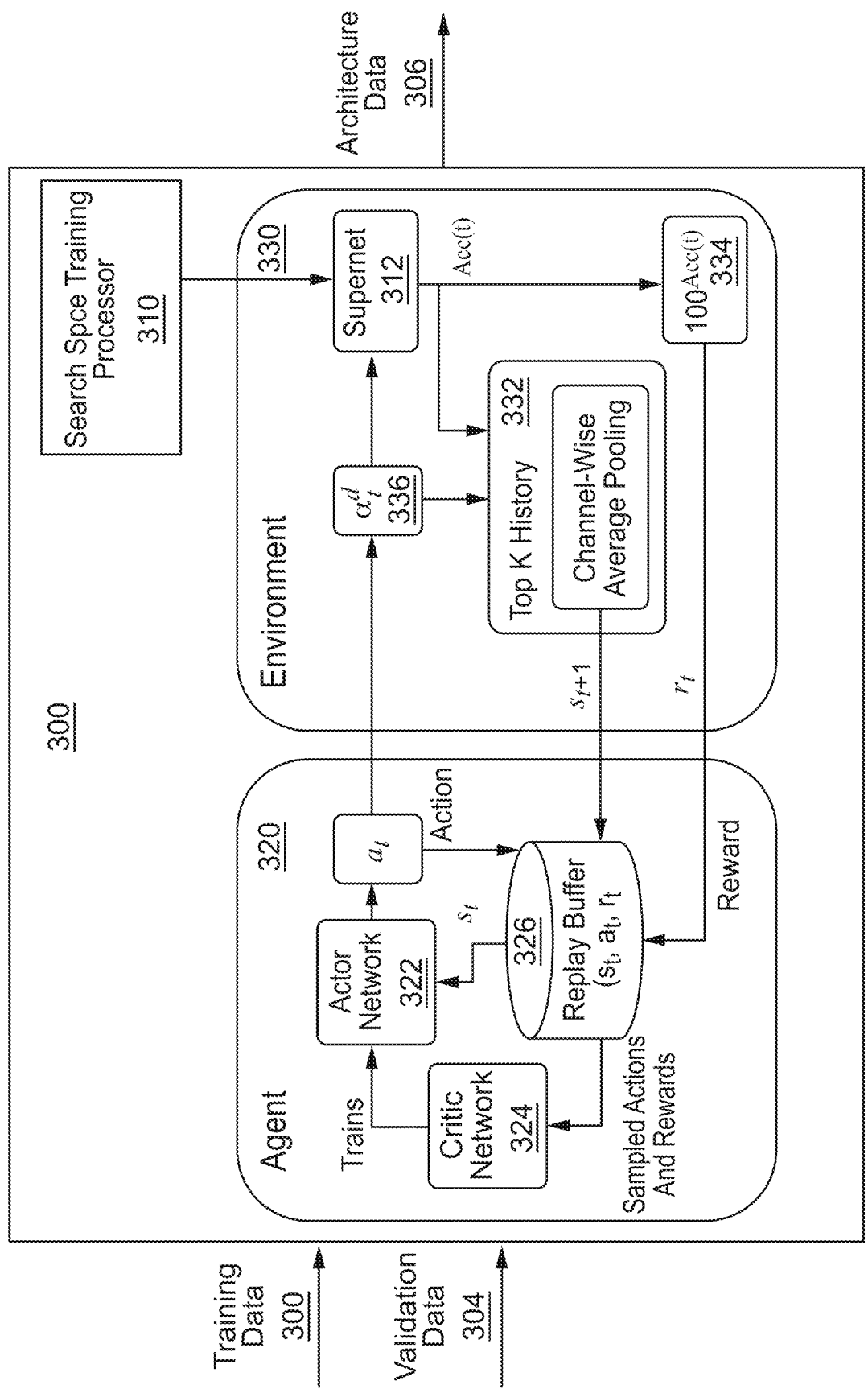
FIG. 3 illustrates a simplified block diagram of an example embodiment of a NAS system in accordance with example embodiments of the present disclosure.

FIG. 3 illustrates a simplified block diagram of an example embodiment of a NAS system 300 in accordance with the present disclosure. The NAS system 300 is an example of a system that may be implemented on one or more computing systems 200 in one or more locations, in which the systems and methods described herein may be implemented. The simplification of NAS system 300 is not intended to be limiting and is provided for the purpose of illustration only.

The NAS system 300 receives inputs that include training data 302 for training a neural network to perform a particular task and validation data 304 as inputs for evaluating the performance of the neural network on the particular task, such as object detection, image detection and classification, image segmentation, audio recognition and classification, text recognition and classification, and the like. The training data 302 and validation data 304 may be, for example, image data representing a digital image, audio data representing an audio file, or text data (i.e. an embedding representing a word or a sentence). The NAS system 300, based on the training data 302 and validation data 304 outputs an architecture data 306 for a child neural network that is configured to perform the particular task for which the training data 302 and validation data 304 were configured. The architecture data 306 may define one or more parameters of the child neural network, including the number of layers, operations performed by each of the layers, connectivity between the layers of the neural network (i.e. which layer/cell receives inputs from which other layer/cell of the neural network).

Instead of updating all of the weight parameters in the entire supernet during the search like DARTS, the NAS system in accordance with the present disclosure train the supernet, which acts as the search space, by sampling individual candidate architectures and only train their corresponding edges (i.e. candidate operations) in the supernet. The approach may better reflect the conditions present when the formal evaluation is performed on individual architectures as discussed in more detail below. Moreover, this approach may have less memory storage requirement during backpropagation, thus allowing larger batches during training as discussed in more detail below.

Figure 4:
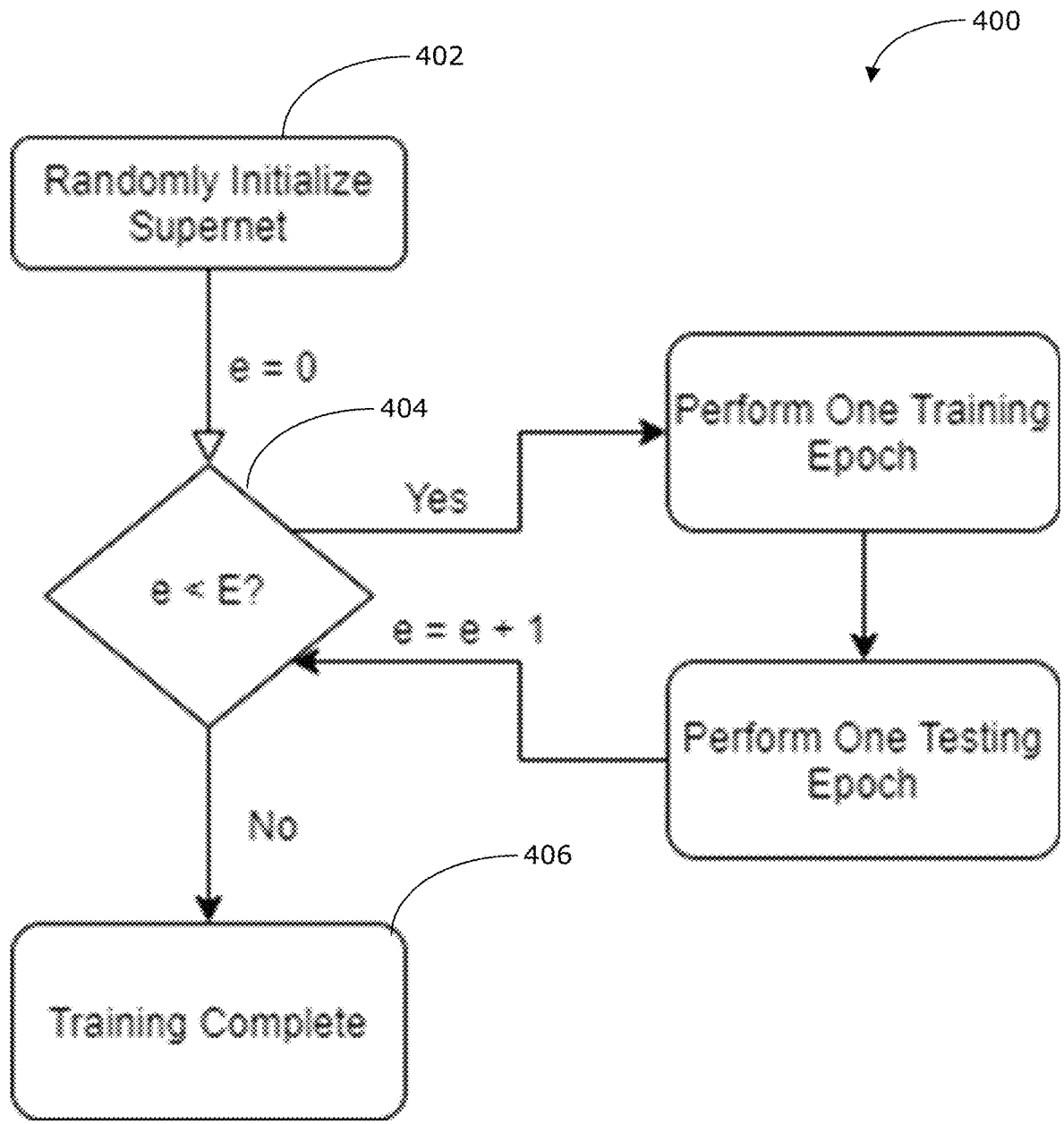
FIG. 4 illustrates a flowchart for search space training method in accordance with example embodiments of the present disclosure.

In the illustrated embodiment, NAS system 300 includes a search space training processor 310 configured to perform training of a supernet 312 which subsumes all possible candidate architectures in a weight-sharing manner and thus constitutes as the search space in accordance with example search space training method 400 utilizing discrete sampling, a flowchart of which is illustrated in FIG. 4.

At step 402, the weight values of the supernet 312 are randomized initially.

At step 404, the supernet 312 is trained for E epochs, or training sessions. In some embodiments, E=10,000 epochs. During each training epoch the supernet 312 is updated via gradient descent using training data 302 divided into batches. In some embodiments, the size of each batch is fixed parameter, |b|, and the number of batches needed to complete an epoch, B, is derived as per Equation (1):

$$B = \frac{\text{Total number of samples in Training Data}}{|b|} \qquad \text{Equation (1)}$$

Each training data sample in a batch is used to train a randomly sampled candidate architecture. Thus, the total number of candidate architectures that may be trained within the supernet 312, or in other words the weight configurations that receive partial learning, may be calculated as per Equation (2):

$$\text{Number of Total Candidate Architecture} = B \times E \qquad \text{Equation (2)}$$

By way of a non-limiting example, with a training dataset having approximately 25,000 samples with a batch size of 250, and 10,000 epochs, the total number of candidate architectures that may be randomly sampled and used to train the supernet 312 would be 1,000,000.

Figure 5:
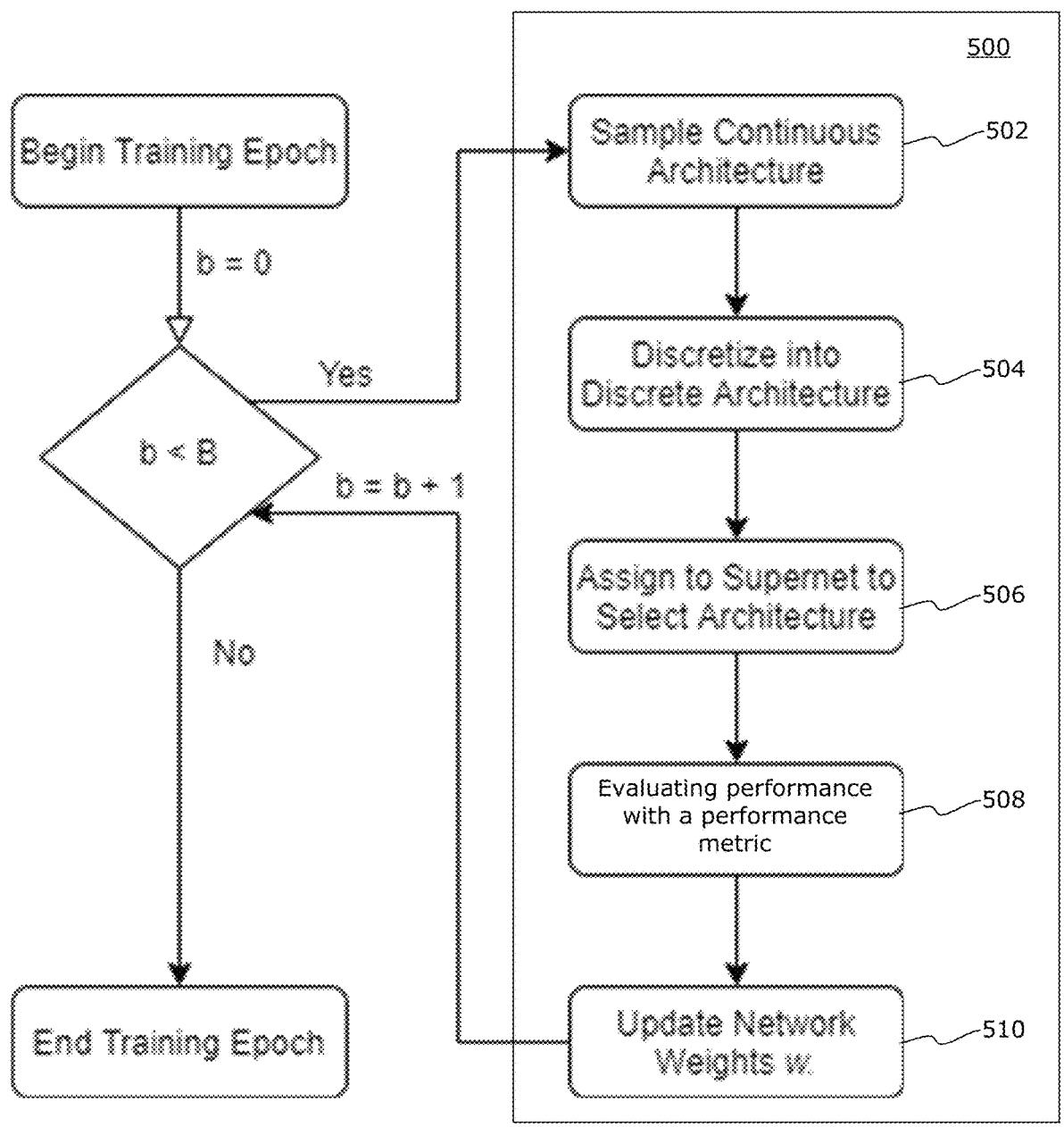
FIG. 5 illustrates the flowchart of an example method that may be implemented during each of the training epochs at step 404 of FIG. 4.

Network weights of supernet 312 are not updated using validation data 304, however, the performance of the supernet 312 on validation data 304 indicates how well the network can generalize on unseen data. The weights of the supernet are fixed, and do not change, following the final epoch. FIG. 5 illustrates the flowchart of an example method 500 that may be implemented during each of the training epochs at step 404.

During each training epoch, the supernet 312 processes each sample of data in training data 302 in batches. Before a batch is processed by the supernet, at step 502, a continuous representation of a candidate architecture is randomly sampled. In some embodiments, the random sampling policy is blind to the performance of different candidate architectures may avoid any bias towards any specific type of candidate architectures. In each batch of training data 302, a random matrix such that $\alpha \in \mathbb{R}^{|E| \times |O|}$ is sampled, where $|E|$ is the number of edges in each architecture cell 100 and may be determined as $|E| = \sum_{i=1}^{|N|}(i+1)$, and edges perform a weighted sum of $|O|$ candidate operations, where $|N|$ is the number of intermediate nodes 102 in the architecture cell 100.

At step 504, the sampled continuous representation $\alpha$, comprising of continuous architecture parameter values for configuring the architecture cells 100 of the supernet 312, is mapped to a discrete representation $\alpha_t^d$. FIG. 6 illustrates an example pseudo-code representation 600 of an algorithm that can be implemented at step 504 for discretization of the continuous sampled architecture representation for DARTS or DARTS-based search spaces. In some embodiments of an algorithm for discretizing architecture representation according to pseudo-code representation 600, the candidate operation mixing weights for a pair of nodes (i, j) are parameterized by a vector α(i, j) of dimension 101. For all |N| intermediate nodes 102 (i.e. for k=0 to k=|N|−1), a candidate operation between the pair of nodes (i, j) is randomly sampled with A=α[Start: End, :]. The operation is discretized by replacing each mixed operation α(i, j) having a continuous and randomized value $A_{ij}$ with the most likely operation, i.e., $(i_1,j_1)$=argmax$_{(i,j)}A_{(i,j)}$, and assigned as the discrete representation having a discrete value of 1 with $\alpha^d$ [Start+$i_1,j_1$]=1 and $\alpha^d$[Start $i_2,j_2$]=1. Once all intermediate nodes 102 have been processed, the discrete representation of a candidate architecture $\alpha^d$ in the search space in the form of a string is generated. It is to be understood that for search spaces that differ from DARTS, other suitable methods of discretization may be needed.

At step 506, the discrete architecture representation $\alpha^d$ is assigned to the supernet 312, which selects a corresponding candidate architecture that may comprise of a plurality of architecture cells 100, each with edges 104 between two intermediate nodes 102 selected based on $\alpha^d$ string values.

At step 508, each training data sample in the training data batch is passed forward as input to be processed by the selected candidate architecture at performing the particular task, such as object detection, image detection and classification, image segmentation, audio recognition and classification, text recognition and classification, and the like. The random sampling of the candidate architecture may avoid any bias in which weight values are updated.

At step 510, the search space training processor 310 evaluates a performance of the trained candidate architecture on the particular task and generates a corresponding performance metric. In some embodiments, the performance of the candidate architecture is evaluated against the validation data 304. The performance metric is then backpropagated to update the network weights W in the supernet 312. In some embodiments, only the network weights W for the candidate architecture are updated so as to better reflect the conditions of the formal evaluation of the candidate architecture. Further, computational resources, such as memory 210 usage may increase dramatically during backpropagation step 510, and consequently may require a lower training data 312 batch size. Lower batch size, based on Equations (1) and (2), may increase the number of candidate architectures sampled, which means expanded exploration and training of the supernet 312.

Referring back to FIG. 4, at step 404, the training epochs are performed one at a time and is repeated until all E epochs are completed. At step 406, upon completion of the final training epoch, the weight values of the trained supernet 312 are fixed and are maintained throughout the model search. By decoupling the supernet training from the model search, the supernet 312 is trained once and may be repeatedly used during model search, which is more computational resource efficient. With the supernet weight fixed after training, no further back propagation may be needed during model search and hence may provide faster computational execution even with larger batch sizes.

Model Searching

With reference to FIG. 3, the model search is conducted through interactions between an agent 320 and an environment 330. In some embodiments, the agent 320 uses a modified Deep Deterministic Policy Gradient (DDPG), a continuous action Reinforcement Learning (RL) algorithm, to search for candidate architectures. The original DDPG algorithm is described by Lillicrap, T. P. et al. "*Continuous control with deep reinforcement learning*", http://arxiv.org/abs/1509.02971 (2015), the disclosure of which is incorporated herein in its entirety.

In the illustrated embodiment in FIG. 3, the agent 320 is a continuous RL agent based on DDPG interacting with a continuous action space. Generally speaking, the continuous RL agent in accordance with the present disclosure includes an actor-critic framework where, generally speaking, the actor samples architectures and the critic learns a mapping between architecture representations and performance metrics that may be used by the actor to generate future architectures. In the illustrated embodiment, the agent 320 includes an actor neural network $\mu(s_t)$ 322 configured to generate an action $a_t$ given the current state $s_t$. The agent 320 also includes a critic neural network $Q(a_t)$ 324, which is configured to learn a mapping between performance metrics (i.e. reward) and a given action at. In the illustrated embodiment, the agent 320 further maintains a replay buffer 326, which is computer-readable storage memory configured to store experience tuples comprised of the state, action, and reward $(s_t, a_t, r_t)$. The agent 320 is configured to interact with the environment for a variable number of steps t. In some embodiments, t may be 500 steps or 1000 steps for a NAS-Bench-201 Oracle Performance benchmark set, which is described in Dong, X., and Yi Y. "NAS-bench-102: Extending the scope of reproducible neural architecture search", International Conference on Learning Representations (2020), the disclosure of which is incorporated herein in its entirety. In some other embodiments, t may be 20,000 steps for a DARTS supernet. At each step t, the agent 320 is configured to generate a continuous action $a_t$ to be performed inside the environment 330, receiving a reward value $r_t$ from the environment 330, and transitions to a state $s_t$. In some embodiments, the agent 320 is configured to explore a large search space and learn to generate actions given the current state $s_t$ in order to locate top performing candidate architectures within a small number steps t.

Depending on the nature of the search space, one of two exploration strategies may be adopted by the Agent 320. For a first search strategy, referred to as the E-greedy strategy, at every step t, the actor neural network 320 may take a random action with probability £ (i.e. Uniform(0,1)). In some embodiments, the value of £ may be initialized with a high value and annealed, such as by cosine annealing schedule, to a minimum value over steps t. The E-greedy strategy may be suitable for oracle performance based search spaces where the number of candidate architectures is relatively small (i.e. approximately 15,625) with known performance metrics such that locating a high-performing architecture within the least number of steps may be desirable.

In a second search strategy, also referred to as the random warm-up strategy, the agent 320 may take random actions in the first W steps. Actions taken during all remaining steps t>W may be determined in accordance with Equation (3). The random warm-up strategy may be desired for embodiments that utilize a supernet search space having relatively large number of architectures ((i.e. DARTS/PC-DARTS supernet with approximately $1 \times 10^{18}$ architectures) with unknown performance metrics such that a more thorough search with less regard for the number of steps taken is more prudent in the search of the high-performing architectures.

In the illustrated embodiment, the environment 330 includes a trained supernet 312, or oracle performance. In some embodiments like the one shown in FIG. 3, the environment 330 may also include an architecture history processor 332, a reward mapper 334, and a discretizer 336.

Figure 7:
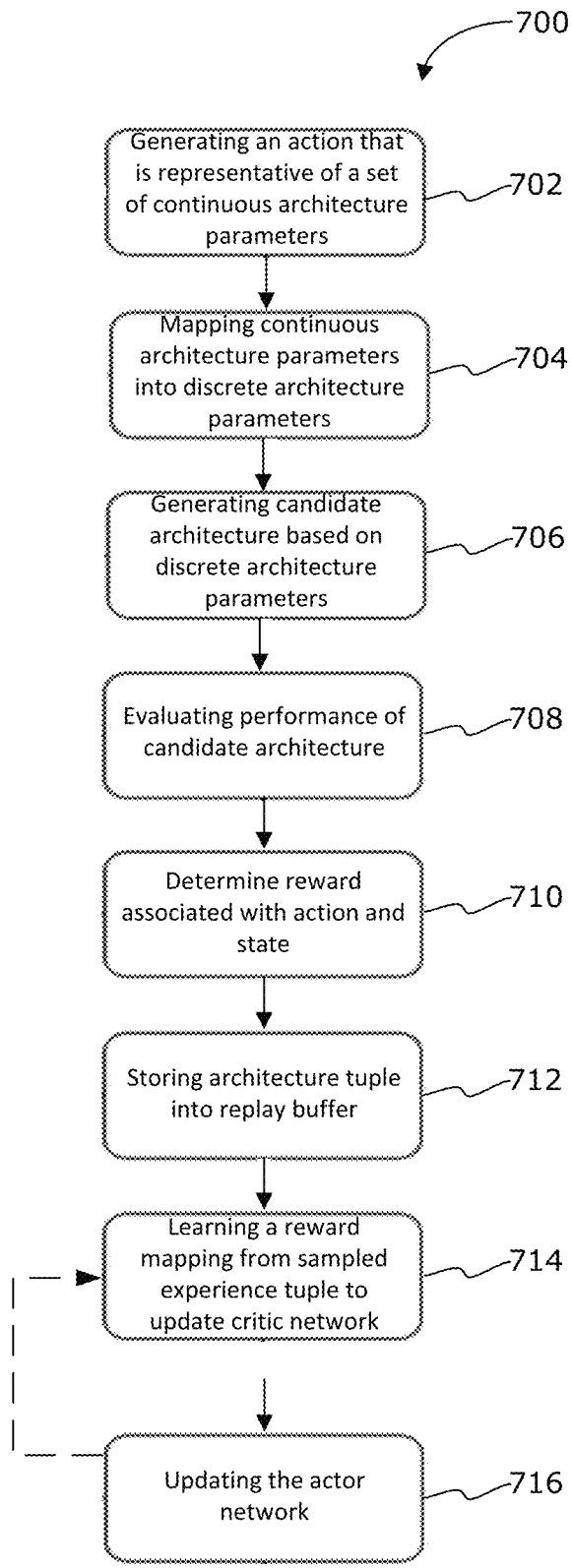
FIG. 7 illustrates an example flowchart of a method for conducting model search using a continuous RL agent based on modified DDPG in accordance with example embodiments of the present disclosure.

FIG. 7 illustrates an example flowchart of a method 700 for conducting model search using a continuous RL agent 320 based on modified DDPG interacting with a continuous action space.

At step 702, the actor neural network 322 takes state $s_t$ as input and generates a continuous action $a_t$, which is a set of candidate architecture parameters $\alpha_t$ having continuous values such that $a_t = \alpha_t \in \mathbb{R}^{|E| \times |O|}$. The $s_t$ may be a channel-wise average of the discrete representation (i.e. $a_t^d$) of the top performing architectures seen by the environment 330. In some embodiments, the continuous action $a_t$ may be defined as per Equation (3):

$$\alpha_t = \mu(s_t) + Z_t \qquad \text{Equation (3)}$$

Where $Z_t$ is a small randomized noise following a uniform distribution Uniform($+\xi$, $\xi$) added to the output of actor neural network 322 to encourage search space exploration by introducing a degree of randomness to the generation of action $a_t$ which may lead to a different discretized version that allows a new candidate architecture to be sampled. In some embodiments, the magnitude of the noise $Z_t$ may be 10,000 to 20,000 times smaller compared to that of the action at. By way of non-limiting examples, with the actor network output $a_t$ bounded in the range of [0,1], the parameter $\xi$ may have a value of $1 \times 10^{-4}$ for a NAS-Bench-201 Oracle performance benchmark set, or a value of $5 \times 10^{-5}$ for a DARTS/PC-DARTS supernet based search space. In some further embodiments, the continuous actions $a_t$ are randomized by selecting a continuous action from a uniform distribution Uniform$(0,1)^{|E| \times |O|}$, instead of being determined by the actor neural network 322 in accordance with Equation (3). In embodiments where the E-greedy strategy is adopted, or during the first W steps of the random warm-up strategy, the action $a_t$ may simply be a randomized value, such as Uniform(0,1).

At step 704, each set of continuous architecture parameters $\alpha_t$, is mapped into discrete architecture parameters $\alpha_t^d$ by discretizer 336. In some embodiments, algorithm 600 may be executed by the discretizer 336 to discretize the continuous architecture parameters $\alpha_t$ into discrete architecture parameters $\alpha_t^d$ such that $\alpha^d \in \{0, 1\}^{|E| \times |O|}$, which comprises discrete values 0 or 1 for any given edge within one or more architecture cells 100 in the supernet 312 that is used to compose a candidate architecture. Therefore, each $\alpha^d$ corresponds to an individual candidate architecture in the search space.

At step 706, a corresponding candidate architecture a is generated by configuring the search space, such as supernet 312, using the discrete architecture parameters $\alpha_t^d$ to select a subset of the architecture cells 100 of the supernet 312 to be active to represent the candidate architecture a. The parameter values of the $\alpha_t^d$ are network parameters that set edges 104 between nodes 102 of one or more architecture cells 100 that comprise the candidate architecture a.

At step 708, the performance of the candidate architecture selected based on the discrete architecture parameters $\alpha^d$ is evaluated. For example the performance of the candidate architecture can be an accuracy value Acc(t) on the validation data 304 as measured by an appropriate accuracy measure. It is to be understood that the performance indicator is task dependent. For example, a classification error rate may be adopted for a classification task, or a perplexity metric may be used for a natural language modelling task.

Figure 8:
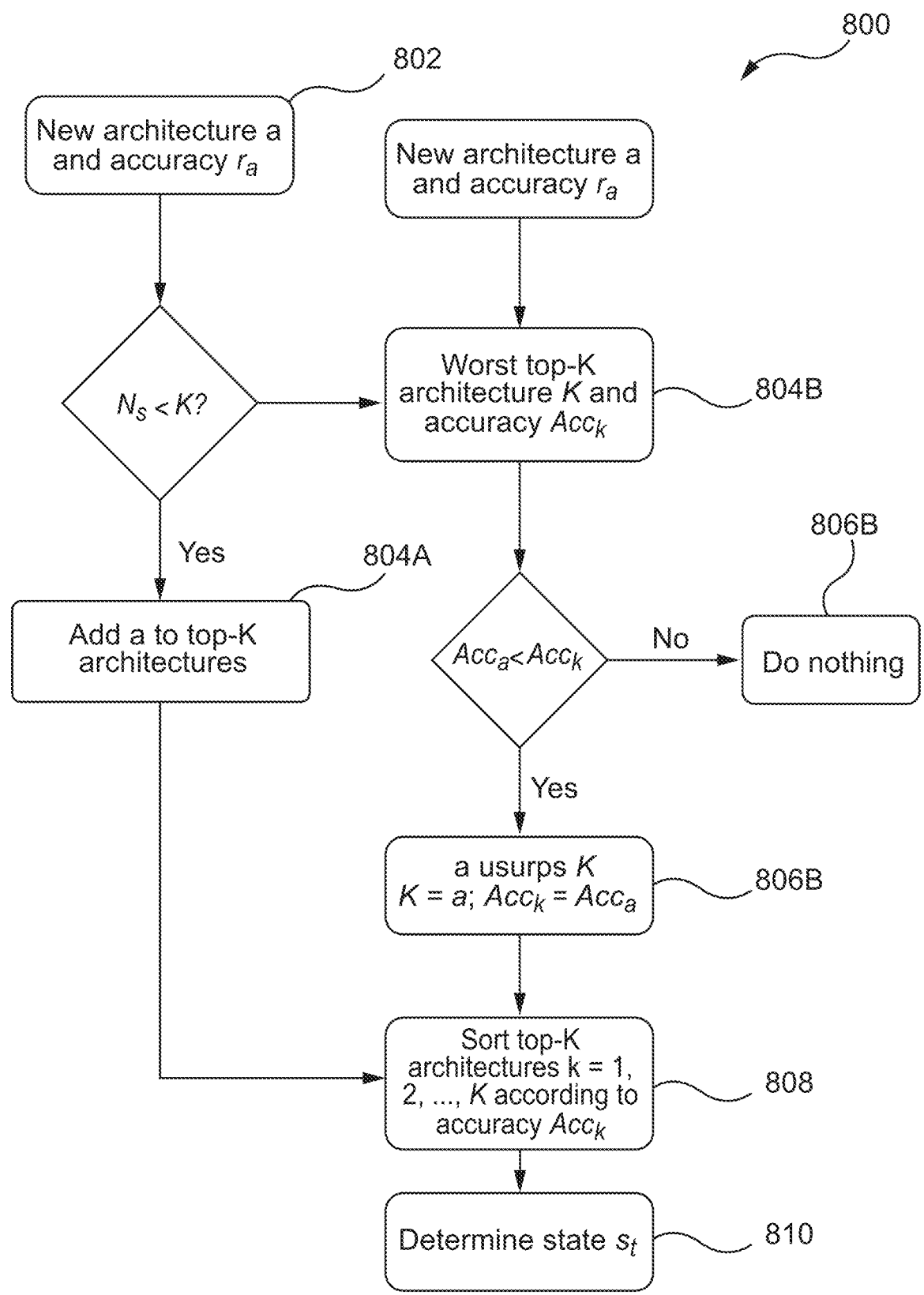
FIG. 8 illustrates a flowchart of an example method for maintaining a list of top performing architectures that may be executed by an architecture history processor at step 708 of FIG. 7.

The candidate architecture is assessed to determine whether it should be stored in architecture history storage as one of the top performance architectures. In some embodiments, the architecture history storage is a history tensor $h_t$ maintained by the architecture history processor 332, where $h_t \in \{0,1\}^{K \times |E| \times |O|}$. In the illustrated embodiment, the K number of discrete architecture parameters $\alpha_t^d$ that have provided the best performance so far (i.e. the highest accuracy values) are stored in history tensor $h_t$. The value of K may be set depending on the nature of the search space. For example, K may be 64 for NAS-Bench-201 oracle performance benchmark set with approximately 15,000 architectures the performance metrics of which are known. Alternatively, K may be 500 for DARTS/PC-DARTS supernet search space with approximately $1 \times 10^{18}$ architectures. In some embodiments, the architecture history processor 332 maintains K number of architectures in the history tensor $h_t$ in sequential order. For example, the K architectures may be kept in the order of best to worst based on performance. In cases where the architecture performance is evaluated in terms of accuracy value, the architecture with the best accuracy value may be stored as the first entry in the history tensor $h_t$ by the architecture history processor 332. The architecture with the worst accuracy value out of the K entries may be stored as the last, or K-th, entry in the history tensor $h_t$. FIG. 8 illustrates a flowchart of an example method 800 for that may be executed by the architecture history processor 332 at step 708 for maintaining a list of top performing architectures.

At step 802, the new candidate architecture a is generated by applying the discrete architecture parameters at step 706, and an evaluation of its performance at step 708, such as an accuracy value $Acc_a$ is presented to the architecture history processor 332.

If the history tensor $h_t$ is not yet full, i.e. the number of stored architecture $N_s$ is less than K, the method proceeds to step 804A, at which the new candidate architecture a and its corresponding performance, such as an accuracy value $Acc_a$, are added to the history tensor $h_t$ by architecture history processor 332.

Alternatively, if the history tensor $h_t$ contains K stored architectures, the method proceeds to step 804B where the by architecture history processor 332 compares the performance, such as the accuracy value $Acc_a$, of candidate architecture a to the performance $Acc_k$ of the worst of the K stored architectures. For example, the candidate architecture may be compared to the K-th architecture in the history tensor $h_t$ when the architectures are stored in order of performance.

At step 806, if the performance of the new candidate architecture a, $Acc_a$, is worse than performance of the worst stored architecture $Acc_k$ (i.e. $Acc_a < Acc_k$) then the new candidate architecture is ignored and the method 800 terminates by taking no further actions at step 806B.

Alternatively, if the performance of the new candidate architecture a, $Acc_a$, is better than performance of the worst stored architecture $Acc_k$ (i.e. $Acc_a < Acc_k$) then the method proceeds to step 806A where the worst stored architecture is replaced by the new candidate architecture a.

Upon completion of step 804A or 806B, the method proceeds to step 808 where the stored architectures in architecture storage 332 are sorted. In some embodiments, the stored architectures are sorted in order of performance, such as accuracy value Acc. An ordered list of stored architecture may ensure that the worst stored architecture K is properly maintained and readily accessible for the next iteration if needed.

At step 810, the history tensor $h_t$ is sorted. A state matrix, or simply state $s_t$ is determined by architecture history processor 332, where the state $s_t$ may be defined as the channel-wise averaging of $h_t$ such that $s_t \in \mathbb{R}^{|E| \times |O|}$. The state $s_t$ may provide statistical information regarding the search space. For example, in some embodiments, each entry of the state matrix $s_t$ represents the sample probability that a specific operation is present on an edge in the top K architectures up to this point. A higher value on an entry may indicate that the corresponding operation-edge pair is favored by high performing architectures. If the new candidate architecture was added to the history tensor $h_t$, then the state $s_t$ would be correspondingly updated for state transition. Otherwise, the state $s_t$ remains the same. The randomized action generation by the actor network 322 may ensure that different action $a_t$ may be generated despite the state $s_t$ could remain the same.

Figure 9:
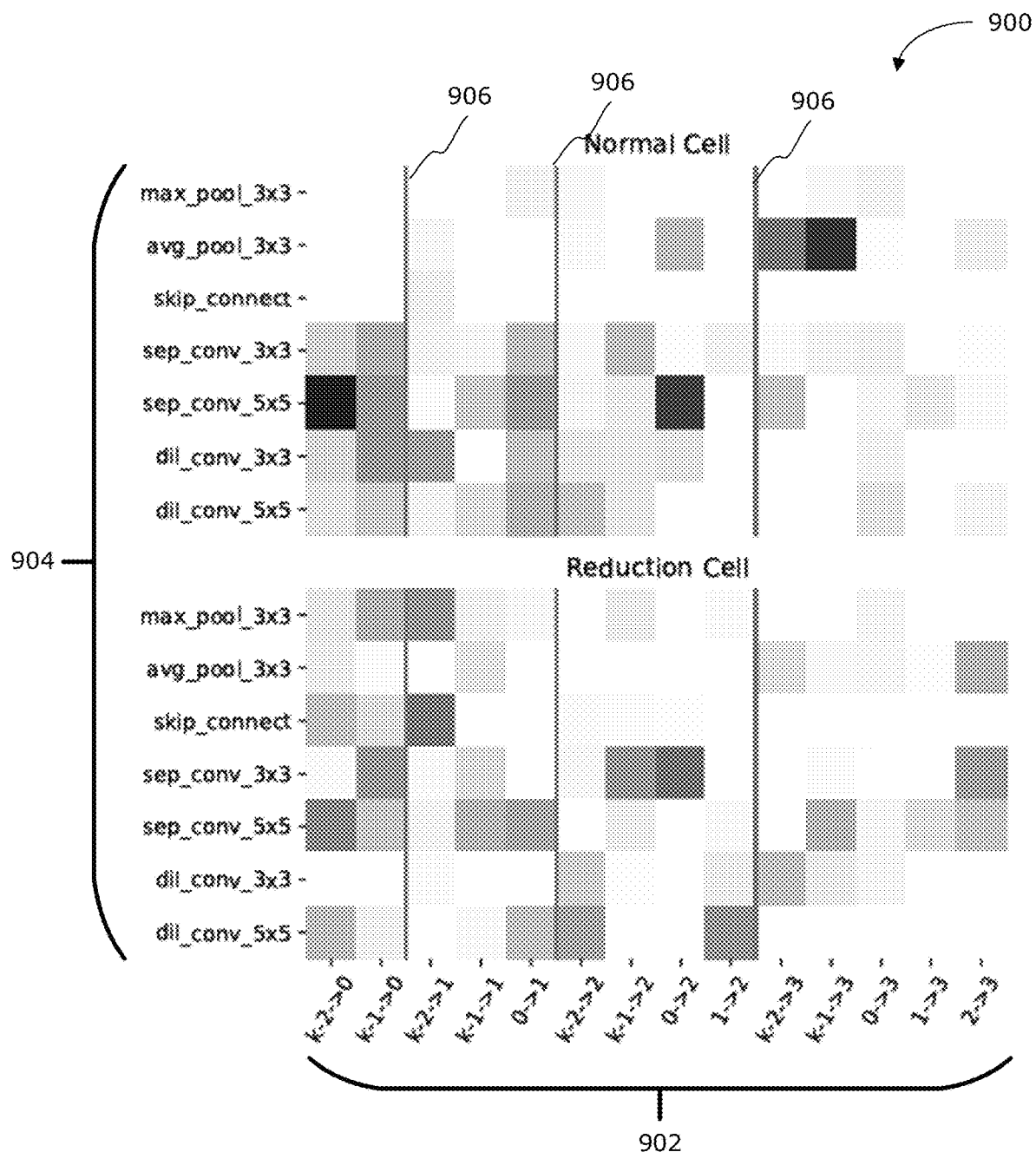
FIG. 9 illustrates an example state matrix of K top performing architectures for a DARTS supernet.

FIG. 9 illustrates an example final state matrix 900 of a normal cell and a reduction cell based on K=500 top performing architectures located by CADAM on the CIFAR-10 benchmark using a PC-DARTS supernet. In the illustrated state matrix, the columns 902 represent edges in the Directed Acyclic Graph (DAG) that describes the DARTS search space; and the rows 904 represent the operations that compete for representation on said edges. In the column headings, "k" denotes cell input and the numbers denote nodes. The vertical bars 906 demarcate boundaries between nodes. The values for a given edge/operation pair for both the normal cell and the reduction cell are determined as the channel average of the 500 top performing architectures located by CADAM. Higher values, as represented by darker shading in the FIG. 9, indicate that an operation is selected for a given edge more commonly in the top performing architectures than the other operations for the same edge. Thus, in some embodiments, the state matrix, such as the one show in FIG. 9, may be extracted to provide statistical/heuristic information on the search space in question such as shown in FIG. 9. As may be observed from FIG. 9, elements corresponding to operation-edge pairs leading into nodes 2 and 3 generally have smaller values than those leading into nodes 0 and 1. This is because there are more candidate operation-edge pairs compete to connect to the deeper nodes, yet the number of operation-edge pairs that can lead into each node remains constant at 2. This shows that high-performing architectures are not limited to specific topologies.

Referring back to FIG. 7, at step 710, the performance of the candidate architecture selected based on discrete architecture parameters $\alpha_t^d$ is mapped to a reward value $r_t$ by the reward mapper 334. For example, the reward value $r_t$ may be a function of the accuracy value Acc(t). In some embodiments where the task is image classification, the reward value $r_t$ may be determined in accordance with Equation (4):

$$r_t = 100^{Acc(\alpha_t^d)} \quad \text{Equation (4)}$$

Where $Acc(\alpha_t^d)$ is the accuracy value of the candidate architecture selected based on the discrete architecture parameters $\alpha_t^d$ in its decimal form, evaluated by the environment 330 at step 708. It is to be understood that other suitable reward functions may be needed for other tasks. Compared to prior art which use multiple steps of discrete actions to learn to construct a high performance neural architecture, which may suffer from sparse reward issues, the NAS system in accordance with the present disclosure provides meaningful reward $r_t$ for each step t for an action $a_t$.

It is to be understood that step 708 need not be executed prior to step 710, and that in some embodiments, step 710 may be executed before, after or concurrently with step 708.

At step 712, the environment 330 returns the state $s_t$ from architecture history processor 332 and the reward $r_t$ from reward mapper 334 as inputs to the agent 320. Along with the continuous action $a_t$ from actor network 322, an architecture tuple including the state $s_t$, action $a_t$, and reward $a_t$, are stored into replay buffer 326 as an experience tuple.

In a typical actor-critic framework, the policy structure (or the actor network) is used to select actions based on a chosen policy, and an estimated value function (or the critic network) criticizes the actions taken by the actor network. The critic network learns about and critiques the chosen policy that being pursued by the actor network. DDPG falls under the actor-critic framework. For fast convergence in differentiable architecture search, the NAS system in accordance with the present disclosure adopts a modified DDPG algorithm by mainly including a quantile loss in the critic training at step 714. In some embodiments, the critic network 324 Q(.) does not take both the current state $s_t$ and the action as inputs like the prior art DDPG algorithm. Instead, critic network 324 only takes action $a_t$ as input such that $r_t \approx Q(\alpha_t)$. At each step t, the agent 320 randomly samples a batch $B_R$ from the experiential replay buffer 326 and uses it to update the critic network 324, and then the actor network 322. In some embodiments, the agent 320 updates the critic network 320 using the check loss in quantile regression, which is described in Koenker, Roger. "Quantile Regression", Cambridge University Press (2005), the disclosure of which is incorporated herein in its entirety. Prior art critics typically use a mean-squared-error (MSE) or L2 loss function with a discounting factor γ typically in the range of [0, 1] such as 0.99 to predict a sum of future rewards. An actor network learns from reward approximations produced by the critic network via gradient ascent. In contrast, the critic network 324 in accordance with the present disclosure replaces the L2 loss function with a check loss to learn the rewards of high-performance (i.e. $95^{th}$ percentile) architectures without discounting. In some embodiments, the loss function of the critic network 324 $\mathcal{L}_{critic}$ may be determined as per Equation (5):

$$\mathcal{L}_{critic} = \frac{1}{|B_R|} \sum_{i \in B_R} u_i(\tau - 1(u_i < 0)) \quad \text{Equation (5)}$$

Where T is a decimal value $\tau \in [0,1]$ that corresponds to the desired quantile level of the reward. The parameter $u_i$ is the difference between the mapped reward for the i-th action $a_i$ and the critic network predicted reward value for $a_i$ as per Equation (6):

$$u_i = r_i - Q(a_i) \quad \text{Equation (6)}$$

Thus, in Equation (5), when the reward predicted by the critic network 324 is greater than the mapped reward, the condition ($u_i<0$) becomes true and (τ−1) becomes a negative number that is positively summed when multiplied with the negative $u_i$. Alternatively, when the reward predicted by the critic network 324 is less than the mapped reward, the condition ($u_i<0$) becomes false and (τ−0) becomes a positive number that is positively summed when multiplied with the positive $u_i$. Thus, any deviation between the critic predicted reward $Q(a_i)$ and the mapped reward $r_i$ for each sample in the batch $B_R$ are summed up and its average, by dividing by $|B_R|$, the number of experience tuples from batch $B_R$ sampled form the replay buffer 326, provides the check loss of the critic network 324. The weights of the critic network 324 are updated to minimize the check loss.

At step 716, the actor network 322 is trained by the critic network 324. In some embodiments, the actor network 322 learns from the critic network 324 with the loss function determined as per Equation (7):

$$\mathcal{L}_{actor} = \frac{1}{|B_R|} \sum_{i \in B_R} Q(\mu(s_i))$$ Equation (7)

In Equation (7), the predicted reward by critic network 324 of each of the actor network 322 output $\mu(s_i)$ for a state corresponding to one of the experience tuples of the batch $B_R$ sampled from the experiential replay buffer 326 are summed and averaged to determine the actor network loss function $\mathcal{L}_{actor}$. The weights of the actor network 322 are adjusted to minimize the loss function as determined by Equation (7).

In some embodiments, such as when the number of steps is tightly constrained, the training of the actor/critic network pair may be accelerated by sampling more than batch $B_R$ from the replay buffer 326 and training the actor/critic networks per steps 714 and 716 multiple times as shown by the dashed line. In some embodiments, the number of training cycles C by Equation (8):

$$C = \min\left(\frac{|R|}{|B_R|}, C_{max}\right)$$ Equation (8)

Where |R| is the number of samples in the replay buffer 326 and $C_{max}$ is a hyperparameter set to denote a maximum number of cycles. For example, $C_{max}$ may be constrained by financial, computational, or time considerations. In some embodiments, the training of actor network 322 and critic network 324 begins when the replay buffer 326 has $|B_R|$ samples.

Advantageously, the critic network 324 may act as a performance predictor, producing an approximation of the reward which can be mapped back into an accuracy estimation.

Furthermore, most search spaces are too large to pick a single architecture at once and prior art NAS systems often need to build architectures over time where, at each step, a discrete choice about one trait of the network is chosen. In contrast, continuous action domain utilized in the NAS system in accordance with the present disclosure is larger than any discrete domain by definition. Therefore, all discrete traits of a network can be discretized from a continuous domain using a many-to-one mapping algorithm such as by algorithm 600 in FIG. 6.

Additionally, example tests have shown that the CADAM system in accordance with the present disclosure may be highly efficient. For example, within 500 queries to an Oracle benchmark set, the NAS-Bench-201, CADAM may achieve performance comparable to the state-of-the-art, while prior art cannot guarantee or does not report the search cost in terms of the number of architectures evaluated in order to reach the reported accuracy. FIG. 10 illustrates a table of the accuracies between CADAM and several state of the art NAS algorithms on the NAS-Bench-201 Oracle performance benchmark set. The NAS-Bench-201, with |E|=6 and |O|=5, includes approximately $5^6$=15,625 possible architectures. The search space may be characterized as a downsized variant of DARTS featuring a different operation set, |O|=5, where each architecture cell only receives input from its predecessor cell. The topology consists of |N|=2 intermediate nodes and |E|=6 edges. Unlike DARTS, all edges perform operations. For the purposes of the experiment, all architecture cells were evaluated on CIFAR-10, CIFAR-100, and ImageNet16-120. The inclusion of accuracy metrics across the entire search space permits testing of CADAM without a weight-sharing supernet. The oracle information that is provided is used to find the highest performing architecture in the least number of steps. In the experiment that produces the results in FIG. 10, the primary goal is to locate an architecture with good performance in as few steps as possible. Thus, some of the operating parameters are set as follows: K=64, τ=0.9, $|B_R|$=8, ξ=5e$^{-5}$, and $C_{max}$=10. The NAS system in accordance with the present disclosure is also configured to perform exploration using the E-greedy strategy with an initial £ value of 1.0, and annealed, using cosine anneal schedule, to a minimum value of 0.05 by step 175. In the testing embodiments, the discretization includes performing an argmax function on each row of $\alpha \in \mathbb{R}^{6\times 5}$ to select operations. As may be observed from the table shown in FIG. 10, CADAM with 500 steps (CADAM-500) and CADAM with 1000 steps (CADAM-1k) generally exhibit standard deviation lower than most of the other algorithms and provide accuracies that are in the top 3 for all three benchmarks.

Figure 11:
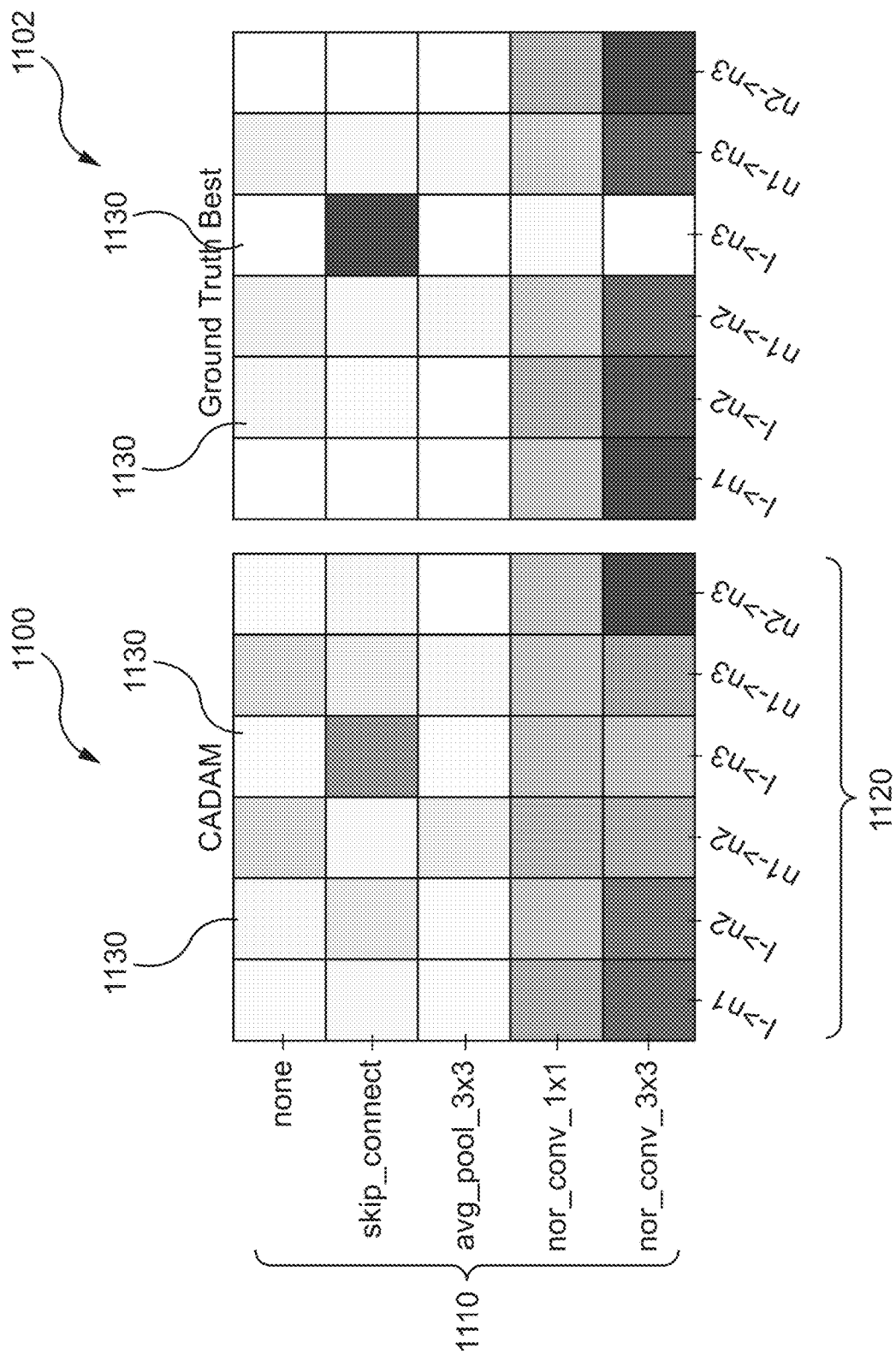
FIG. 11 illustrates a side-by-side comparison of the final state matrix of CADAM after running for 500 steps on the NAS-Bench-201 benchmark set on the CIFAR 100 test accuracy with the average of the absolute top-K best architectures.

FIG. 11 illustrates a side-by-side comparison of the final state matrix of CADAM after running for 500 steps on the NAS-Bench-201 benchmark set on the CI FAR 100 test accuracy 1100 with the average of the absolute top-K best architectures as determined by exhaustive search 1102, which serves as the ground truth best. Rows in FIG. 11, collectively referred to by 1110, indicate operations, columns collectively referred to by 1120 indicate edges, and vertical bars 1130 demarcate node boundaries. Variable "i" denotes input, "n" denotes an intermediate node, and K=64. Darker elements indicates higher values, which indicates more frequency selection in top performing architectures. As may be observed from FIG. 11, the top 64 architectures located by CADAM after querying a fraction of the NAS-Bench-201 bears close resemblance to that found by the exhaustive search approach. For example, the "none" and "avg_pool_3×3" operations are rarely selected in both CADAM and the ground truth best. Additionally, "skip_connect" or skip connection should only be selected for the fourth edge as shown in both state matrices for connection the cell input to the third and final node. Thus, the table shown in FIG. 10 and the state matrix shown in FIG. 11 as provided by CADAM may provide results and information regarding a search space.

FIG. 12 illustrates a table of the accuracies between CADAM and several state of the art NAS algorithms on pre-trained DARTS and PC-DARTS supernets on the CIFAR-10 benchmark test. Both supernets include |N|=4 intermediate nodes and |E|=14 edges. Discretization algorithm 600 is applied to ensure 8 edges are activated at a time, matching the constraints of the evaluation space. The operation space is a subset of DARTS that includes |O|=7 potential candidates where the operation "none" is omitted. The supernets is trained on CIFAR-10 with approximately 50,000 training samples and 10,000 test samples. The training sample sets of CIFAR-10 are split into an equally sized training and validation set. The partitioned training set is used to train the supernet and to perform a search to find a neural network architecture. The found architecture is then evaluated, the results of which are shown in FIG. 12.

Unlike using oracle performance, the best architectures and accuracy values are not known when using a supernet. Additionally, the DARTS/PC-DARTS supernets are significantly larger than the NAS-Bench-201 Oracle performance benchmark set by orders of magnitude. Therefore, in this scenario, the goal of CADAM is to explore the search space sufficiently such that a range of high performing candidate architectures can be located and stored in the list of top performing architectures. Thus, there is no step budgeting concern. In this example, K=500 in order to collect more top performing architectures, τ=0.95 to select architecture with $95^{th}$ performance quantile or better, $|B_R|$=64, =5e$^{-5}$, and $C_{max}$=1. The agent is run with 20,000 steps on each supernet and the replay buffer is limited to contain at least 5,000 experience tuples. Exploration of the supernets is achieved using random warm-up with W=3000. For evaluation purposes, for each discrete architecture parameter in the top performing architecture list, the discrete architecture is assigned to the supernet to generate primary test accuracy values. The architecture with the best test accuracy is selected as the best architecture. In FIG. 12, the table entry "CADAM" denotes CADAM with DARTS supernet, and the entry "PC-CADAM" denotes CADAM with PC-DARTS supernet. As may be observed from the table in FIG. 12, in terms of both accuracy and model parameters both CADAM configurations perform well against other NAS algorithms.

FIG. 13 illustrates a table of the accuracies between CADAM (with DARTS supernet), PC-CADAM (with PC-DARTS supernet) and several state of the art NAS algorithms on the ImageNet dataset benchmark on similar CADAM parameter configuration as that of FIG. 12. The ImageNet dataset contains approximately 1.2 M training samples, a subset of which was used to train the supernet. For the shown results, the first 120 classes of the ImageNet dataset were selected and downsampled to be 32×32 in resolution to train the supernet. It should be noted that the architecture prefixes denote the variant of DARTS search space, while suffixes denote dataset used to train the supernet. For example, "C10" for CIFAR-10, and "IN" for ImageNet". Here, all relevant architectures are formally evaluated for the "Top-1" accuracy percentage, which is a measure of the percentage of the results generated by an architecture for the task image classification as is the case for ImageNet that matches the correct answer, and the "Top-5" accuracy percentage, which is a measure of the percentage of the results generated by an architecture for the task of image classification from ImageNet where the right answer was identified in the top five highest probabilistic classes. As may be observed from FIG. 13, CADAM provides results that are comparable to the other DARTS-based algorithms.
General Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for neural architectural search (NAS) for performing a task, the method comprising:
 (i) generating, by an actor neural network having actor parameters in accordance with current values of the actor parameters, a set of continuous neural network architecture parameters comprising score distributions over possible values for configuring a plurality of architecture cells of a trained search space;
 (ii) discretizing the set of continuous architecture parameters into a set of discrete neural network architecture parameters;
 (iii) generating a candidate architecture by configuring the trained search space using the discrete neural network architecture parameters, which specify a subset of the plurality of architecture cells to be active;
 (iv) evaluating a performance of the candidate architecture at performing the task;
 (v) determining a reward and a state for the discrete neural network architecture parameters based on the performance;
 (vi) storing an experience tuple comprising the continuous neural network architecture parameters, the reward, and the state in a buffer storage;
 (vii) learning a mapping, by a critic neural network, between network architectures and performance; and
 (viii) updating the actor neural network with the learned mapping from the critic neural network.

2. The method of claim 1, wherein the generating the set of continuous neural network architecture parameters comprises incorporating a randomized noise value into the set of continuous neural network architecture parameters.

3. The method of claim 1, wherein the search space is a weight-sharing supernet, and is trained by:
 in each training session in a plurality of training sessions:
  generating, from a set of training data, a batch of training data comprising a plurality of training data samples; and
  for each training data sample:
   generating a set of continuous neural network architecture parameters comprising score distributions over possible values for configuring the plurality of architecture cells;

discretizing the set of continuous architecture parameters into a set of discrete neural network architecture parameters;
selecting a candidate architecture by assigning the discrete neural network architecture parameters to the supernet;
evaluating a performance of the selected candidate architecture at performing the task with a performance metric;
determining a loss value as a function of the difference between the performance metric and validation data; and
updating a subset of the weight values of the supernet to minimize the loss value.

4. The method of claim 3, wherein the updating further comprises only updating the weight values of the supernet that are associated with the candidate architecture.

5. The method of claim 1, further comprising:
storing, based on the performance of the candidate architecture, a list of top performing candidate architectures into an architecture history storage.

6. The method of claim 5, wherein the storing comprises:
comparing the performance of the candidate architecture with a performance of a worst stored architecture;
if the performance of the candidate architecture is better than the performance of the worst stored architecture, replacing the worst stored architecture with the candidate architecture; and
sorting the list of top performing architecture based on performance.

7. The method of claim 1, wherein the discretizing uses a many-to-one mapping algorithm.

8. The method of claim 1, wherein the learning comprises:
sampling a batch from the buffer storage; and
for each experience tuple in the batch, performing operations comprising:
predicting a reward of the candidate architecture based on a current mapping;
determining a check loss using quantile regression as a function of the predicted reward and the reward from each experience tuple; and
updating the current mapping to minimize the check loss.

9. The method of claim 8, wherein the check loss is determined using the following equation:

$$\mathcal{L}_{critic} = \frac{1}{|B_R|} \sum_{i \in B_R} u_i(\tau - 1(u_i < 0)),$$

where $\mathcal{L}_{critic}$ is the check loss, $B_R$ is the batch of training data, $\tau$ is a decimal value $\tau \in [0,1]$ that corresponds to a desired quantile level of the reward from each experience tuple, and $u_i$ is a difference between the predicted reward and the reward from each experience tuple.

10. The method of claim 9, wherein the parameter $u_i$ is determined using the following equation:

$$u_i = r_i - Q(a_i),$$

where $r_i$ is a mapped reward for the $i^{th}$ action $Q(a_i)$ is the predicted reward value for $a_i$, and $u_i$ is the difference between the mapped reward for the $i^{th}$ action $a_i$ and the predicted reward value for $a_i$.

11. The method of claim 9, wherein the parameter T is used to cause the critic to learn a mapping from a desired performance quantile of candidate architectures.

12. The method of claim 9, wherein the task is image classification and reward value $r_t$ may be determined in accordance with the following equation:

$$r_t = 100^{Acc(\alpha_t^d)},$$

where $Acc(\alpha_t^d)$ is the accuracy value of the candidate architecture selected based on the discrete architecture parameters $\alpha_t^d$ in its decimal form.

13. The method of claim 1, wherein the updating comprises:
determining a loss value using the following equation:

$$\mathcal{L}_{actor} = \frac{1}{|B_R|} \sum_{i \in B_R} Q(\mu(s_i)),$$

where $\mathcal{L}_{actor}$ is the loss value of the actor neural network, $B_R$ is the batch of training data, and $Q(\mu(s_i))$ is a predicted reward by critic neural network of each output $\mu(s_i)$ of the actor neural network for a state corresponding to one of the experience tuples of the batch training data $B_R$.

14. The method of claim 2, wherein the randomized noise value is incorporated into the set of continuous neural network architecture parameters in accordance with a probability value associated with each continuous neural network architecture parameter.

15. The method of claim 14, further comprising:
initializing the probability value indicative of high probability; and
annealing the probability value to a minimum value over a plurality of cycles.

16. The method of claim 15, wherein the annealing further comprises applying a cosine annealing schedule.

17. The method of claim 1, wherein the operations (i) to (viii) are repeatedly performed.

18. The method of claim 17, wherein each experience tuple is comprised of the state, action, and reward $(s_t, a_t, r_t)$ for each step t, wherein the state $s_t$ defines a set of channel-wise average of discrete neural network architecture parameters, the action $a_t$ is a set of continuous neural architecture parameters, and the reward $r_t$ defines the reward.

19. A computing device, comprising:
one or more processors configured to:
generate, by an actor neural network having actor parameters in accordance with current values of the actor parameters, a set of continuous neural network architecture parameters comprising score distributions over possible values for configuring a plurality of architecture cells of a trained search space;
discretize the set of continuous architecture parameters into a set of discrete neural network architecture parameters;
generate a candidate architecture by configuring the trained search space using the discrete neural network architecture parameters, which specify a subset of the plurality of architecture cells to be active;
evaluate a performance of the candidate architecture at performing a task;
determine a reward and a state for the discrete neural network architecture parameters based on the performance;
store an experience tuple comprising the continuous neural network architecture parameters, the reward, and the state in a buffer storage;

learn a mapping, by a critic neural network, between network architectures and performance; and update the actor neural network with the learned mapping from the critic neural network.

20. A non-transitory machine-readable storage medium having tangibly stored thereon executable instructions for execution by a processor of a computing device that, in response to execution by the processor, cause the computing device to:

generate, by an actor neural network having actor parameters in accordance with current values of the actor parameters, a set of continuous neural network architecture parameters comprising score distributions over possible values for configuring a plurality of architecture cells of a trained search space;

discretize the set of continuous architecture parameters into a set of discrete neural network architecture parameters;

generate a candidate architecture by configuring the trained search space using the discrete neural network architecture parameters, which specify a subset of the plurality of architecture cells to be active;

evaluate a performance of the candidate architecture at performing a task;

determine a reward and a state for the discrete neural network architecture parameters based on the performance;

store an experience tuple comprising the continuous neural network architecture parameters, the reward, and the state in a buffer storage;

learn a mapping, by a critic neural network, between network architectures and performance; and update the actor neural network with the learned mapping from the critic neural network.

* * * * *

UNITED STATES PATENT AND TRADEMARK OFFICE
CERTIFICATE OF CORRECTION

PATENT NO. : 11,914,672 B2
APPLICATION NO. : 17/488796
DATED : February 27, 2024
INVENTOR(S) : Mohammad Salameh, Keith George Mills and Di Niu It is certified that error appears in the above-identified patent and that said Letters Patent is hereby corrected as shown below:

In the Specification

Column 11, Line 5 "dimension 101" should read -- dimension $|O|$ --

Column 11, Line 13 "$\alpha^d$[Start i$_2$, j$_2$] = 1." should read -- $\alpha^d[Start + i_2, j_2] = 1.$ --

Column 12, Line 41 "E-greedy" should read -- ε-greedy --

Column 12, Line 43 "probability £" should read -- probability ε --

Column 12, Line 44 "the value of £" should read -- the value of ε --

Column 12, Line 46 "E-greedy" should read -- ε-greedy --

Column 13, Line 8 "a$_t$=a$_t$" should read -- $\alpha_t = a_t$ --

Column 13, Line 9 "(i.e. a$_t$ $^d$)" should read -- (i.e. $\alpha_t^d$) --

Column 13, Line 16 "Uniform(+ξ, ξ)" should read -- $Uniform(-ξ, ξ)$ --

Column 13, Line 32 "E-greedy" should read -- ε-greedy --

Column 13, Line 41 "α$^d$ E{0, 1}$^{|E|×|0|}$," should read -- $\alpha^d \in \{0, 1\}^{|E| \times |O|}$, --

Column 16, Line 44 "Where T is a" should read -- Where τ is --

Column 17, Line 62 "101=5" should read -- $|O| = 5$ --

Signed and Sealed this
Twenty-sixth Day of November, 2024

Katherine Kelly Vidal
*Director of the United States Patent and Trademark Office*

CERTIFICATE OF CORRECTION (continued)
U.S. Pat. No. 11,914,672 B2

Column 18, Line 14 "E-greedy" should read -- ε-greedy -- and "initial £ value" should read -- initial ε value --

Column 19, Line 8 "$|B_R| = 64, = 5e^{-5}$" should read -- $|B_R| = 64, \xi = 5e^{-5}$ --

In the Claims

Column 21, Line 61 "action $Q(a_i)$" should read -- action $a_i$, $Q(a_i)$ --

Column 21, Line 65 "parameter T" should read -- parameter $\tau$ --